United States Patent
Su et al.

(10) Patent No.: US 12,521,707 B2
(45) Date of Patent: Jan. 13, 2026

(54) PREPARATION CAPABLE OF SIMULTANEOUSLY REMOVING NO, SO$_2$ AND HCl

(71) Applicant: University of Science and Technology Beijing, Beijing (CN)

(72) Inventors: Wei Su, Beijing (CN); Yang Zheng, Beijing (CN); Rongrong Lei, Beijing (CN); Changjiang Hou, Beijing (CN); Jinglei Tian, Beijing (CN); Mengying Ma, Beijing (CN); Hualong Zhou, Beijing (CN); Wenbo Zhang, Beijing (CN); Jiaqing Wang, Beijing (CN); Peiying Wang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 19/027,341

(22) Filed: Jan. 17, 2025

(65) Prior Publication Data

US 2025/0242341 A1 Jul. 31, 2025

(30) Foreign Application Priority Data

Jan. 29, 2024 (CN) .......................... 202410119739.8

(51) Int. Cl.
| | | |
|---|---|---|
| *B01J 21/18* | (2006.01) | |
| *B01D 53/86* | (2006.01) | |
| *B01J 23/72* | (2006.01) | |
| *B01J 37/00* | (2006.01) | |
| *B01J 37/02* | (2006.01) | |
| *B01J 37/04* | (2006.01) | |
| *B01J 37/08* | (2006.01) | |
| *B01J 37/12* | (2006.01) | |

(52) U.S. Cl.
CPC ........ *B01J 37/088* (2013.01); *B01D 53/8609* (2013.01); *B01D 53/8628* (2013.01); *B01D 53/8637* (2013.01); *B01D 53/8659* (2013.01); *B01J 21/18* (2013.01); *B01J 23/72* (2013.01); *B01J 37/0036* (2013.01); *B01J 37/0207* (2013.01); *B01J 37/0236* (2013.01); *B01J 37/04* (2013.01); *B01J 37/12* (2013.01); *B01D 2255/20761* (2013.01); *B01D 2257/2045* (2013.01); *B01D 2257/302* (2013.01); *B01D 2257/404* (2013.01); *B01D 2258/0283* (2013.01)

(58) Field of Classification Search
None
See application file for complete search history.

(56) References Cited

FOREIGN PATENT DOCUMENTS

| | | | |
|---|---|---|---|
| CN | 102513100 | * | 6/2012 |
| CN | 104785302 | * | 7/2015 |
| CN | 107088361 | * | 8/2017 |
| CN | 109876824 | * | 6/2019 |
| CN | 109908967 | * | 6/2019 |
| CN | 110227428 | * | 9/2019 |
| CN | 110508276 | * | 11/2019 |
| CN | 114345392 A | | 4/2022 |
| CN | 114682283 | * | 7/2022 |
| CN | 116273042 | * | 6/2023 |
| CN | 117563621 A | | 2/2024 |
| CN | 118950029 A | | 11/2024 |
| JP | 2001294414 | * | 10/2001 |
| MY | 157061 | * | 4/2016 |

OTHER PUBLICATIONS

Millipore Sigma. "Copper Nitrate Trihydrate". https://www.sigmaaldrich.com/US/en/substance/copperiinitratetrihydrate2416010031433?srsltid=AfmBOoqzZ9bF849tENwCwovAhpL4BpSKI251-R8vqN3Im8RZVH7hf8a_ 2025 (Year: 2025).*

Chang et al. "Hydrogenation of CO2 over nickel catalysts on rice husk ash-alumina prepared by incipient wetness impregnation". Applied Catalysis. Elsevier. 399-320. 247 (2003). (Year: 2003).*

* cited by examiner

*Primary Examiner* — Sheng H Davis
(74) *Attorney, Agent, or Firm* — Nitin Kaushik

(57) ABSTRACT

The present invention discloses a preparation method for an activated coke catalyst capable of simultaneously removing NO, SO$_2$, and HCl. The method includes: step 1: crushing and sieving activated coke to obtain coke particles with a particle size of 40-60 microns; step 2: putting the activated coke in an oxidizing agent, stirring at 80° C. for 8 h to allow for a thorough mixing and reaction, washing the activated coke obtained after the reaction until a neutral pH is reached, and drying to obtain activated coke with oxygen-containing functional groups; and step 3: impregnating, by equivalent-volume impregnation, the activated coke with oxygen-containing functional groups obtained in step 2 with a copper nitrate trihydrate aqueous solution for 24 h, drying, and putting the activated coke in a resistance furnace, and introducing argon for calcination to obtain the activated coke catalyst capable of simultaneously removing NO, SO$_2$, and HCl.

3 Claims, No Drawings

PREPARATION CAPABLE OF SIMULTANEOUSLY REMOVING NO, SO₂ AND HCl

CROSS-REFERENCE TO RELATED APPLICATIONS

The application claims priority to Chinese patent application No. 2024101197398, filed on Jan. 29, 2024, the entire contents of which are incorporated herein by reference.

TECHNICAL FIELD

The present invention relates to the technical field of catalysts, in particular to a preparation method for an activated coke catalyst capable of simultaneously removing NO, $SO_2$ and HCl.

BACKGROUND

In the implementation of "ultra-low emission" transformation in the steel industry, with effective control of conventional flue gas pollutants (such as sulfur, nitrogen oxides, and particulates), how to address unconventional flue gas pollutants such as chlorine, mercury and ammonia has become a key to the success of the "ultra-low emission" transformation in the steel industry. HCl is the fifth major air pollutant in the steel industry, following $SO_2$, NOX, particulates, and fluorides. In the meanwhile, up to 58% of chlorine-containing gases are emitted from the iron ore sintering process, making it the main source of chlorine-containing gas emissions in the steel industry. In recent years, studies have shown that in the activated coke desulfuration and denitration process, the presence of chlorine in sintering flue gas can lead to the formation of NH4Cl scales, which interferes with the dry activated coke system, thereby affecting the desulfuration and denitration efficiency.

Therefore, it is particularly important to efficiently remove pollutants $SO_2$, NOX, and HCl from sintering flue gas under the premise of cost saving, energy conservation, and multi-pollutant synergistic treatment.

Existing mature technologies for removing NO and $SO_2$/HCl from stationary pollution sources involve selective catalytic reduction (SCR) of NO using $NH_3$ in the presence of $O_2$, and adsorption or catalytic oxidation of $SO_2$/HCl using Ca-based absorbents or metal oxide-supported catalysts. However, such catalysts operate at relatively high temperatures; and the two-step technology for removing NO and $SO_2$/HCl is high in cost, and may lead to the formation of ammonium sulfate, ammonium chloride, and other substances that may block pores of the catalysts.

SUMMARY

An objective of the present invention is to provide a preparation method for an activated coke catalyst capable of simultaneously removing NO, $SO_2$, and HCl, so as to solve the problems raised in the above background.

To achieve the above objectives, the present invention provides a technical solution as follows:

The present invention discloses a preparation method for an activated coke catalyst capable of simultaneously removing NO, $SO_2$ and HCl, the method including:

step 1: crushing and sieving activated coke to obtain coke particles with a particle size of 40-60 microns;

step 2: putting the activated coke in an oxidizing agent, stirring at 80° C. for 8 h to allow for a thorough mixing and reaction, washing the activated coke obtained after the reaction until a neutral pH is reached, and drying to obtain activated coke with oxygen-containing functional groups; and step 3: impregnating, by equivalent-volume impregnation, the activated coke with oxygen-containing functional groups obtained in step 2 with a copper nitrate trihydrate aqueous solution for 24 h, drying, and putting the activated coke in a resistance furnace, and introducing argon for calcination to obtain the activated coke catalyst capable of simultaneously removing NO, $SO_2$, and HCl.

As a further scheme of the present invention, in step 1, the oxidizing agent is 65% nitric acid with a concentration of 3 mol/L to 5 mol/L.

As a further scheme of the present invention, in step 1, a mass ratio of the activated coke to the oxidizing agent is 1:(5-15).

As a further scheme of the present invention, in step 2, a volume content of the copper (II) nitrate trihydrate aqueous solution is 5.4 ml/g to 12.6 ml/g based on mass of activated coke.

As a further scheme of the present invention, in step 2, an amount of CuO supported on the final activated coke catalyst is 3 wt % to 7 wt %.

As a further scheme of the present invention, in step 2, the catalyst is calcined at 300° C. for 2 h under an argon atmosphere.

Compared with the prior art, the present invention has the following beneficial effects:

By the preparation of a catalyst based on a sintering flue gas desulfuration and denitration system, simultaneous removal of multiple pollutants such as sulfur, nitrogen oxides, and chlorine can be achieved. In the meanwhile, the NO reduction temperature is reduced to save cost. A catalyst support has a relatively low surface acidity, so that the tendency of coke formation is lowered.

DETAILED DESCRIPTION OF THE EMBODIMENTS

Example 1

Activated coke was put in 3 mol/L of 65% nitric acid, and stirred at 80° C. for 8 h to allow for a thorough mixing and reaction, the activated coke obtained after the reaction was washed until a neutral pH is reached, and drying was conducted at 105° C. for 12 h to obtain activated coke with oxygen-containing functional groups. Then 10 g of activated coke with oxygen-containing functional groups was impregnated with 54 mL of copper (II) nitrate trihydrate aqueous solution for 24 h, dried at 105° C. for 12 h, and then put in a resistance furnace and calcined at 300° C. for 2 h to obtain the catalyst.

Embodiment 2

Activated coke was put in 4 mol/L of 65% nitric acid, and stirred at 80° C. for 8 h to allow for a thorough mixing and reaction, the activated coke obtained after the reaction was washed until a neutral pH is reached, and drying was conducted at 105° C. for 12 h to obtain activated coke with oxygen-containing functional groups. Then 10 g of activated coke with oxygen-containing functional groups was impregnated with 90 mL of copper (II) nitrate trihydrate aqueous solution for 24 h, dried at 105° C. for 12 h, and then put in a resistance furnace and calcined at 300° C. for 2 h to obtain the catalyst.

Embodiment 3

Activated coke was put in 5 mol/L of 65% nitric acid, and stirred at 80° C. for 8 h to allow for a thorough mixing and reaction, the activated coke obtained after the reaction was washed until a neutral pH is reached, and drying was conducted at 105° C. for 12 h to obtain activated coke with oxygen-containing functional groups. Then 10 g of activated coke with oxygen-containing functional groups was impregnated with 126 mL of copper (II) nitrate trihydrate aqueous solution for 24 h, dried at 105° C. for 12 h, and then put in a resistance furnace and calcined at 300° C. for 2 h to obtain the catalyst.

Comparative Example 1

The difference between Comparative Example 1 and Example 2 lies in that activated coke was put in 1 mol/L of 65% nitric acid for a mixing and reaction, while contents not mentioned in this example were the same as those in Example 2.

Comparative Example 2

The difference between Comparative Example 2 and Example 3 lies in that 20 g of activated coke with oxygen-containing functional groups was impregnated with 144 mL of copper (II) nitrate trihydrate aqueous solution for 24 h, while contents not mentioned in this example were the same as those in Example 2.

Comparative Example 3: Unmodified Activated Coke Catalyst that is Available on the Market Performance Evaluation:

Testing condition: The modified activated coke sample prepared in the example was put in a quartz tube reactor, and the reactor was then put in a tube furnace with the temperature adjusted to 180° C. A mixed gas of $SO_2$, HCl and NO with a total gas flow rate of 1 L/min was introduced into the reactor, and concentration changes of HCl, $SO_2$ and NO were monitored in real time using a Fourier infrared spectrometer. The desulfuration, dechlorination and denitration efficiency was tested. Test results were shown in Table 1.

TABLE 1

Comparison of catalytic performance between Examples 1-3 and Comparative Examples 1-3

| | Catalyst preparation | Desulfuration efficiency | Dechlorination efficiency | Denitration efficiency |
| --- | --- | --- | --- | --- |
| Example 1 | 3 mol/L of 65% nitric acid + 54 mL of copper (II) nitrate trihydrate aqueous solution | 78.2% | 79.6% | 76.3% |
| Example 2 | 4 mol/L of 65% nitric acid + 90 mL of copper (II) nitrate trihydrate aqueous solution | 84.8% | 85.2% | 82.5% |
| Example 3 | 5 mol/L of 65% nitric acid + 126 mL of copper (II) nitrate trihydrate aqueous solution | 90.7% | 95.2% | 97.1% |
| Comparative Example 1 | 1 mol/L of 65% nitric acid + 54 mL of copper (II) nitrate trihydrate aqueous solution | 63.6% | 74.1% | 71.4% |
| Comparative Example 2 | 5 mol/L of 65% nitric acid + 144 mL of copper (II) nitrate trihydrate aqueous solution | 69.4% | 66.2% | 55.6% |
| Comparative Example 3 | Unmodified activated coke | 54.0% | 56.2% | 48.7% |

As can be seen from experimental results in Table 1, Experimental Examples 1-3 all achieve great improvements in desulfuration efficiency, dechlorination efficiency and denitration efficiency compared with Comparative Example 3. The principle is as follows: in the present invention, the content of oxygen-containing functional groups on the surface of the activated coke is increased by modifying the activated coke with nitric acid, and CuO is supported on the activated coke. Compared with the unmodified activated coke in Comparative Example 3, the catalyst in the present invention has rich oxygen-containing functional groups, and the oxygen-containing functional groups can promote the removal of $SO_2$, thereby improving the desulfuration efficiency. The CuO supported on the activated coke can completely react with HCl in flue gas to form a hydroxychloride intermediate which is then converted into $Cl_2$ for dechlorination. On copper-based catalysts, CO can replace $NH_3$ as a reducing gas to react with NO, which solves the problem of denitration catalyst deterioration caused by the formation of $NH_4Cl$, thereby improving the denitration efficiency.

Compared with Experimental Example 1, the concentration of nitric acid used in Comparative Example 1 is 1 mol/L, which is relatively low. The purpose of nitric acid modification is to increase the content of oxygen-containing functional groups (such as carboxyl and carbonyl groups) on the surface of activated coke. These oxygen-containing functional groups on the surface play an important role in the desulfuration reaction, and with the increase of the content of oxygen-containing functional groups, the desulfuration efficiency is improved accordingly. When nitric acid with different concentrations is used for modification, the content of oxygen-containing functional groups increases differently, and oxygen-containing functional groups are increased with an appropriate concentration. Therefore, Example 1 achieves a better desulfuration effect than Comparative Example 1.

Compared with Example 3, in Comparative Example 2, the amount of copper (II) nitrate trihydrate aqueous solution used is different, resulting in a different amount of CuO supported on the activated coke. The supported CuO provides new active sites for dechlorination. HCl in the flue gas can completely react with CuO to form a hydroxychloride intermediate which acts as a transporter for chlorine atoms present on the catalyst surface, and the chlorine atoms are then converted into $Cl_2$ to be released. Meanwhile, during the denitration process, on a copper-based catalyst, CO in flue gas can replace $NH_3$ as a reducing gas to react with NO, which avoids ammonium salt deposition on the catalyst, thereby improving the denitration efficiency. However, in Comparative Example 2, the excessively supported CuO can lead to the blockage of micropores in the activated coke, resulting in a decrease in the micropore volume and a reduction in the number of active sites on the activated coke. This reduces the amount of $SO_2$, HCl, and NO gas that are absorbed, which in turn lowers the desulfuration, dechlorination, and denitration efficiency.

The foregoing descriptions are merely preferred specific embodiments of the present invention, but are not intended to limit the protection scope of the present invention. Any equivalent replacement or variation made by a person skilled in the art according to the technical solutions of the present invention and the inventive concept thereof within the technical scope disclosed in the present invention shall fall within the protection scope of the present invention.

What is claimed is:

1. A preparation method for an activated coke catalyst, comprising:
   (a) crushing and sieving activated coke to obtain particles with a size of 40-60 microns;
   (b) oxidizing the particles in a 3-5 mol/L nitric acid solution diluted from 65% (w/w) concentrated nitric acid at 80° C. for 8 hours, washing until neutral pH, and drying to obtain oxidized activated coke with carboxyl and hydroxyl groups;
   (c) impregnating the oxidized activated coke by equivalent-volume impregnation with a copper nitrate trihydrate aqueous solution for 24 hours, followed by drying;
   (d) calcining the impregnated activated coke in a resistance furnace at 300° C. for 2 hours under argon atmosphere to obtain a catalyst with 3-7 wt % CuO loading.

2. The method of claim 1, wherein a mass ratio of activated coke to oxidizing agent in step (b) is 1:(5-15).

3. The method of claim 1, wherein the equivalent-volume impregnation uses a solution volume of 5.4-12.6 mL per gram of activated coke.

* * * * *